March 2, 1926.
F. H. HOWARD
I-BEAM CLAMP
Filed Nov. 4, 1925
1,575,268
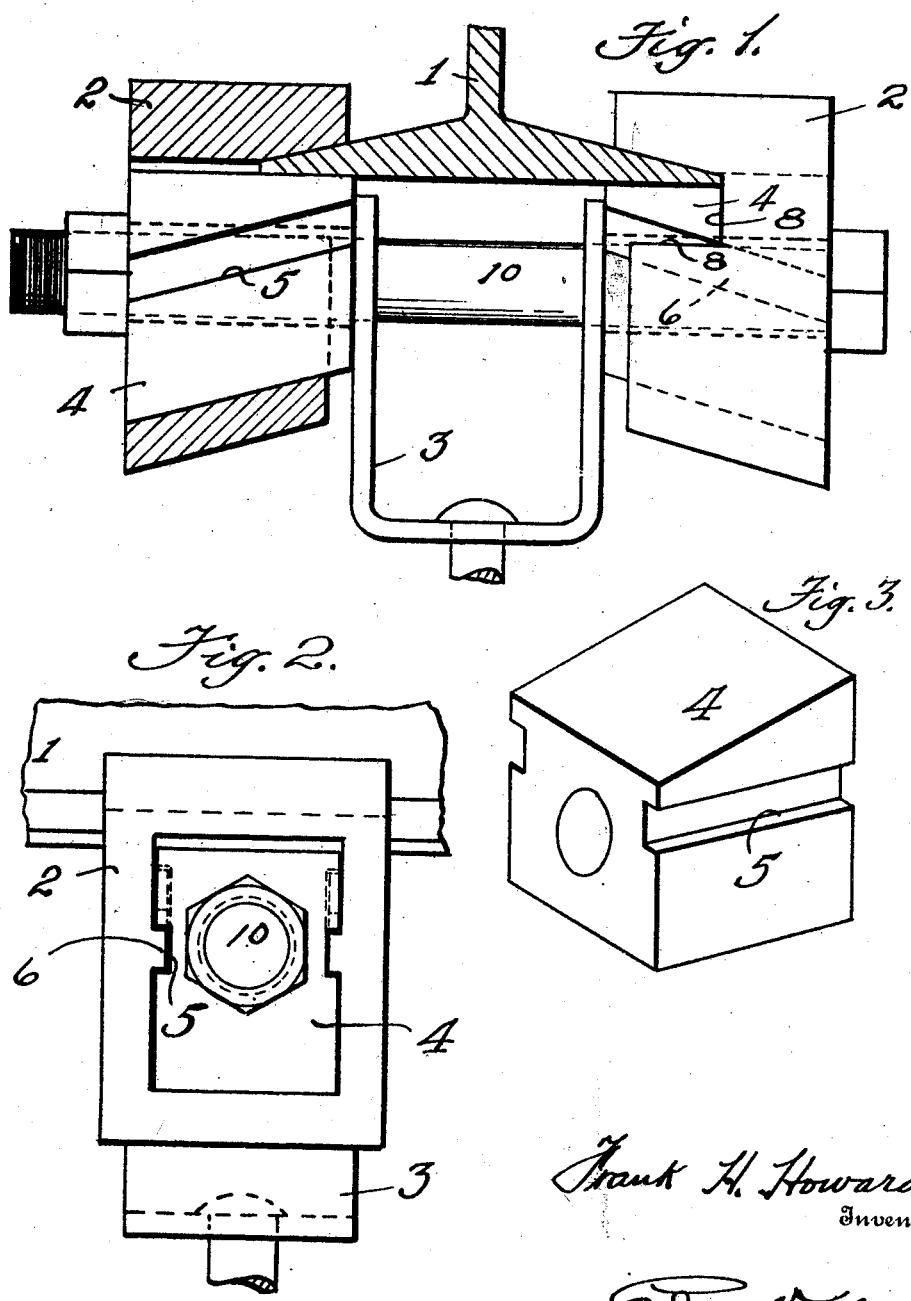
Frank H. Howard, Inventor
By Attorney Patented Mar. 2, 1926.

1,575,268

UNITED STATES PATENT OFFICE.

FRANK H. HOWARD, OF READING, PENNSYLVANIA.

I-BEAM CLAMP.

Application filed November 4, 1925. Serial No. 66,742.

*To all whom it may concern:*

Be it known that I, FRANK H. HOWARD, a citizen of the United States, residing at Reading, in the county of Berks and State of Pennsylvania, have invented certain new and useful Improvements in I-Beam Clamps, of which the following is a specification.

This invention relates to improvements in I-beam clamps and it pertains more particularly to a clamp that is applicable to I-beams of different sizes.

The invention consists of a pair of clamping members, held in alinement and capable of being drawn towards each other by a bolt, and a pair of tapered blocks located within the members, the movement of which latter, in the members, is accomplished through the medium of the bolt and the object of which is to prevent all rocking or tilting of the parts.

The invention is more fully described in the following specification and clearly illustrated in the accompanying drawing, in which:—

Figure 1 is a front elevational view of the clamp, with one of the clamp members shown in section.

Figure 2 is an end view thereof.

Figure 3 is a perspective view of one of the tapered blocks.

The numeral 1 designates an I-beam and 2 the body members, of which there are two, oppositely disposed and between which is located any suitable suspending device 3.

Within each of the body members, is located a tapered block 4, each of which is formed with an inclined groove 5 on each of its opposed side walls and these grooves fit over and are adapted to slide on interior, inclined lugs 6 on the inner walls of the body members.

The numeral 10 designates a bolt which passes through both the blocks and the suspending device 3.

The inner face of each of the body members is formed with a recess 8 to accommodate the lower flanges of the I-beam, as disclosed in Figure 1. These flanges rest between the upper surfaces of the tapered blocks 4 and the under face of the recess 8.

It is evident, that when the device is applied to an I-beam the drawing up of the bolt 10 will draw the parts together and securely clamp them, and, that the tapered sliding blocks 4 will engage and hold the I-beam flange irrespective of the size thereof, within certain predetermined limits, thus providing a clamp that will be applicable to many sizes of I-beams.

Having thus described the device what I claim and desire to secure by Letters Patent is:—

1. In an I-beam clamp, a pair of clamping members having inclined lugs formed on their inner walls, a pair of tapered sliding blocks located within the said members and having grooves engaging the lugs, said clamping members having recesses in their inner faces to accommodate the flange of the I-beam, and a bolt passing through the tapered blocks and adapted to draw the clamping parts towards each other and into engagement with the I-beam.

2. In a clamping device, a pair of clamping members formed with recesses in the inner faces and inclined lugs on their inner walls, a pair of tapered sliding blocks located within the said members, each having a pair of grooves in its opposite walls to engage the said lugs and a bolt passing through the said blocks and adapted to draw them towards each other.

In testimony whereof I affix my signature.

FRANK H. HOWARD.